United States Patent [19]
Beine

[11] 3,963,565
[45] June 15, 1976

[54] HOLDDOWN ARRANGEMENT FOR REMOVABLE COVER OF A PRESSURIZED NUCLEAR-REACTOR CORE AND METHOD OF USING SAME

[75] Inventor: Burkhard Beine, Tonisvorst, Germany

[73] Assignee: Siempelkamp Giesserei KG, Krefeld, Germany

[22] Filed: Feb. 11, 1974

[21] Appl. No.: 441,491

[30] Foreign Application Priority Data
  Feb. 13, 1973  Germany.......................... 2306947

[52] U.S. Cl.................................. 176/38; 176/87; 220/224
[51] Int. Cl.²......................................... G21C 9/00
[58] Field of Search......................... 176/37, 38, 87; 220/223, 224

[56] References Cited
UNITED STATES PATENTS

| | | | |
|---|---|---|---|
| 3,801,448 | 4/1974 | Brandsetter...................... | 176/87 X |
| 3,814,667 | 6/1974 | Klumb et al........................ | 176/87 |
| 3,837,694 | 9/1974 | Frisch............................... | 176/87 X |
| 3,851,906 | 12/1974 | Frisch et al....................... | 176/87 X |

*Primary Examiner*—Stephen C. Bentley
*Assistant Examiner*—Peter A. Nelson
*Attorney, Agent, or Firm*—Karl F. Ross; Herbert Dubno

[57] ABSTRACT

A pressurized nuclear-reactor core is surrounded by a burst shield having a side wall formed with a plurality of longitudinal passages in which are received longitudinal prestressing elements whose upper ends extend beyond the upper edge of the side wall. The cover is formed with a plurality of holes that register with the passages in the side wall so that the cover can be set over top of the side wall with the upper ends of the prestressing elements projecting beyond the cover. Each prestressing element is provided at its upper end with an anchor body which can bear in force-transmitting relationship either with the side wall of the burst shield through a sleeve received in the cover and having a lower end standing on the upper edge of the side wall and an upper end adjacent the anchor body, or with the cover by means of a removable nut screwed on to the anchor body and engageable in force-transmitting relationship with the cover. In use the anchor body is dimensioned to pass through the cover on the top of the side wall so that when this cover is to be removed the nut is unscrewed and the anchor body bears through the sleeve on the upper edge of the side wall in order that the side wall not be destressed.

8 Claims, 6 Drawing Figures

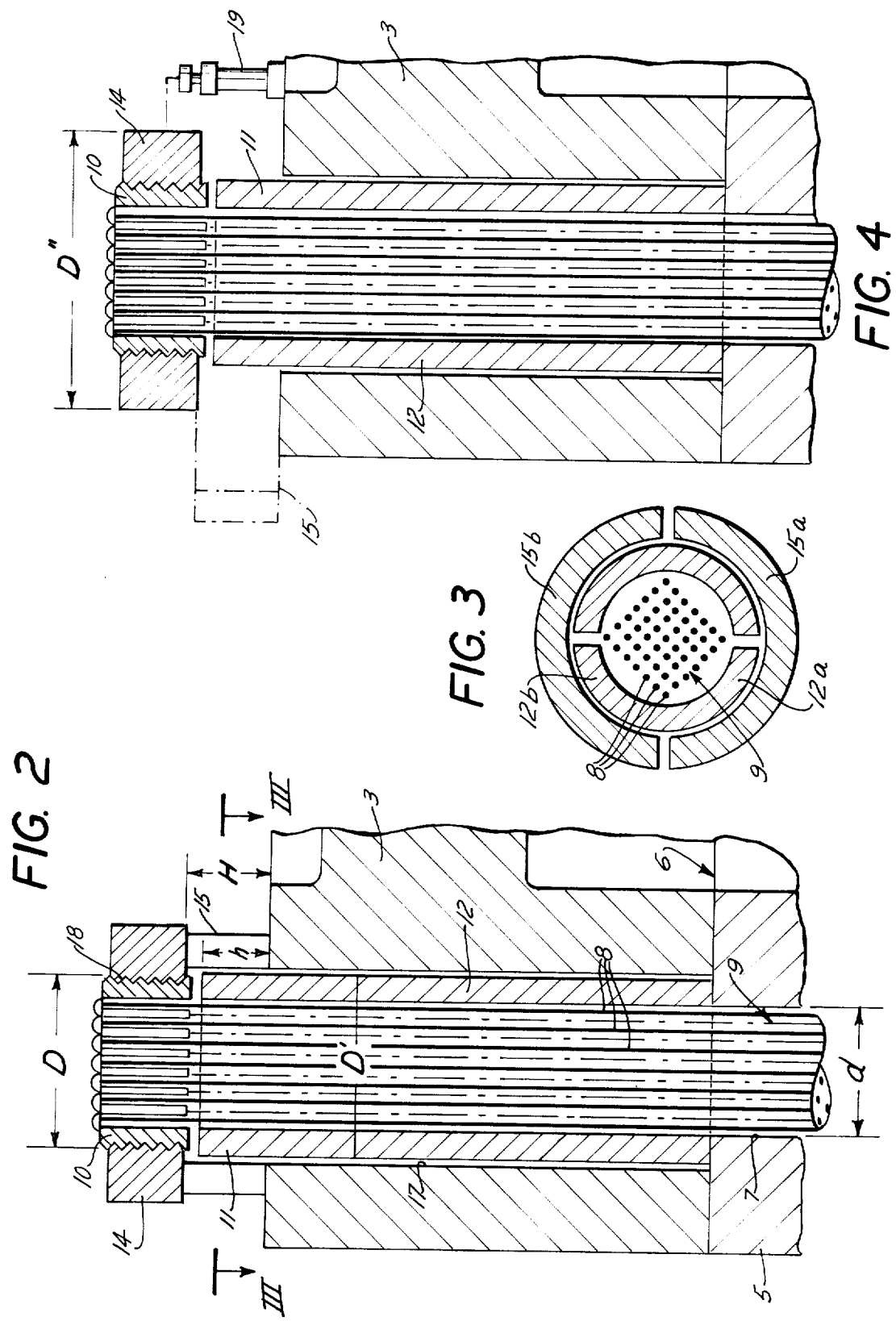

HOLDDOWN ARRANGEMENT FOR REMOVABLE COVER OF A PRESSURIZED NUCLEAR-REACTOR CORE AND METHOD OF USING SAME

CROSS REFERENCE TO RELATED APPLICATION

This application is related to the commonly assigned copending application Ser. No. 441,492 filed Feb. 11, 1974 by myself and Franz SCHILLING.

FIELD OF THE INVENTION

The present invention relates to a nuclear reactor burst shield. More particularly this invention concerns a prestressed shield and a method of partially disassembling same.

BACKGROUND OF THE INVENTION

It is known to make pressurized-water, boiling-water, and pressurized-gas nuclear reactors with a shield surrounding the pressurized core, in order to protect the surroundings should the core burst. Such a burst shield is disclosed in the above cited copending application and in U.S. Pat. No. 3,734,827 issued May 22, 1973 to Franz SCHILLING.

As a rule it has been found necessary to provide an inspection cavity between the pressurized core and the burst shield. A test head, such as an ultrasonic transducer, is introduced in this cavity to detect developing flaws or cracks in core. In the above-cited copending application there is described a burst shield formed of a plurality of cast-iron segments, the side walls of the shield being formed by elements having the shape of segments of a cylindrical annulus or sleeve, and the end walls being formed of cast-iron segments of a circle. Circumferential and longitudinal prestressing elements secure the hollow cast-iron elements together to form an extremely strong burst shield. This type of shield is substantially lighter and cheaper to manufacture than the hitherto known shield which has to be made in situ. A plurality of spacer elements constitute a lining which completely fills the inspection cavity, so that the cover or face of the shield must be removed in order to withdraw these spacer elements so that the core can be inspected. This is made substantially more difficult by the fact that these elements are all prestressed together, and any release of the prestressing force would cause the various parts to move relative to one another, thereby creating a considerable leak potential.

OBJECTS OF THE INVENTION

It is therefore an object of the present invention to provide an improved burst shield for a pressurized nuclear reactor core.

Another object is the provision of an improved method of opening up such a burst shield to gain access to the interior thereof, in particular the inspection cavity therein.

Another object is the provision of a system whereby the cover of the burst shield can be readily removed so as to allow access to the interior of the shield.

SUMMARY OF THE INVENTION

These objects are obtained according to the present invention in a prestressed shield for a nuclear reactor having a side wall formed with a plurality of passages opening at the upper edge of the side wall, and having an elongated stressing member received in each of these passages and projecting from the edge. The cover is engageable over the edge and is formed with a plurality of throughgoing holes which register with the passages and up through which the end of each of these stressing members project. A spacer element is received in each of the holes or orifices and extends up through the cover, having one edge resting on the edge or otherwise in force-transmitting relationship with the side wall and another end projecting upwardly beyond the cover. Each stressing member which projects up past a respective spacer element is provided at its upper end with an under body through which it can be brought to bear either on the spacer element, and hence on the side wall, or on the cover.

In this manner it is possible to clamp the cover to this side wall by means of the longitudinal stressing members used to prestress the side wall. In addition it is possible to disengage these longitudinal stressing members from the cover while leaving them bearing on the side wall so that the cover can be removed without destressing the side wall. In the prior art is has been found necessary as a general rule to clamp the cover over the top of the side wall by means of complicated and expensive hydraulic arrangements.

In accordance with another feature of this invention the spacer elements are elongated and stand on the upper edge of the side wall, and the stressing members are each provided at their upper end with a laterally projecting body having a diameter less than the diameter of the holes through the cover. This body bears on the top of the spacer elements when the cover is removed. In addition this body is externally threaded so that a nut can be screwed over top of it and brought to bear through secondary spacer bodies on the top of the cover, thereby pulling the bodies away from the first spacer elements so that this end of the respective stessing element bears on the side wall through the cover.

In accordance with yet another feature of this invention the spacer element between the side wall and the body on the top of this respective prestressing element is a simple generally cylindrical tube having an upper end engageable with the body and a lower end resting on the side wall edge, the stressing element passing longitudinally through the tube. The spacer element engageable between the nuts and the top of the cover is formed as a plurality of sections, together forming a generally cylindrical tube which surrounds the first-mentioned tube. This sectioned tube is removable once the nut is lifted from it by means of a hydraulic jack or the like.

A burst shield according to the present invention is extremely simple in design and can be made up in situ with little difficulty. It is prestressed even when the cover is removed so that the possibility of leakage or of the assembly coming apart is completely eliminated. In fact it has been found to be an extremely simple operation to remove the cover, a single worker need merely move around the cover with a jack to successively remove the various spacers between each of the clamping bodies and cover, and thereafter the cover is easily lifted off by means of a magnetic grab or the like. Then the filler bodies are withdrawn as described in the above-mentioned application, and the core can be inspected with ease. After inspection the filler bodies are replaced and the cover is set back on top of the side wall whereupon a single man with a small jack adapted for this purpose need merely pull up each of the anchor bodies and slip the spacers back in place to prestress the whole assembly together again.

BRIEF DESCRIPTION OF THE DRAWING

The above and other objects, features, and advantages of the present invention will become more readily apparent from the following description, reference being made to the accompanying drawing in which:

FIG. 2 is a detail of the core and burst shield as indicated by the circle II of FIG. 1;

FIG. 3 is a section taken along line III—III of FIG. 2;

FIG. 4 has a view similar to FIG. 2 with the cover spacer body removed;

SPECIFIC DESCRIPTION

Figure 1:
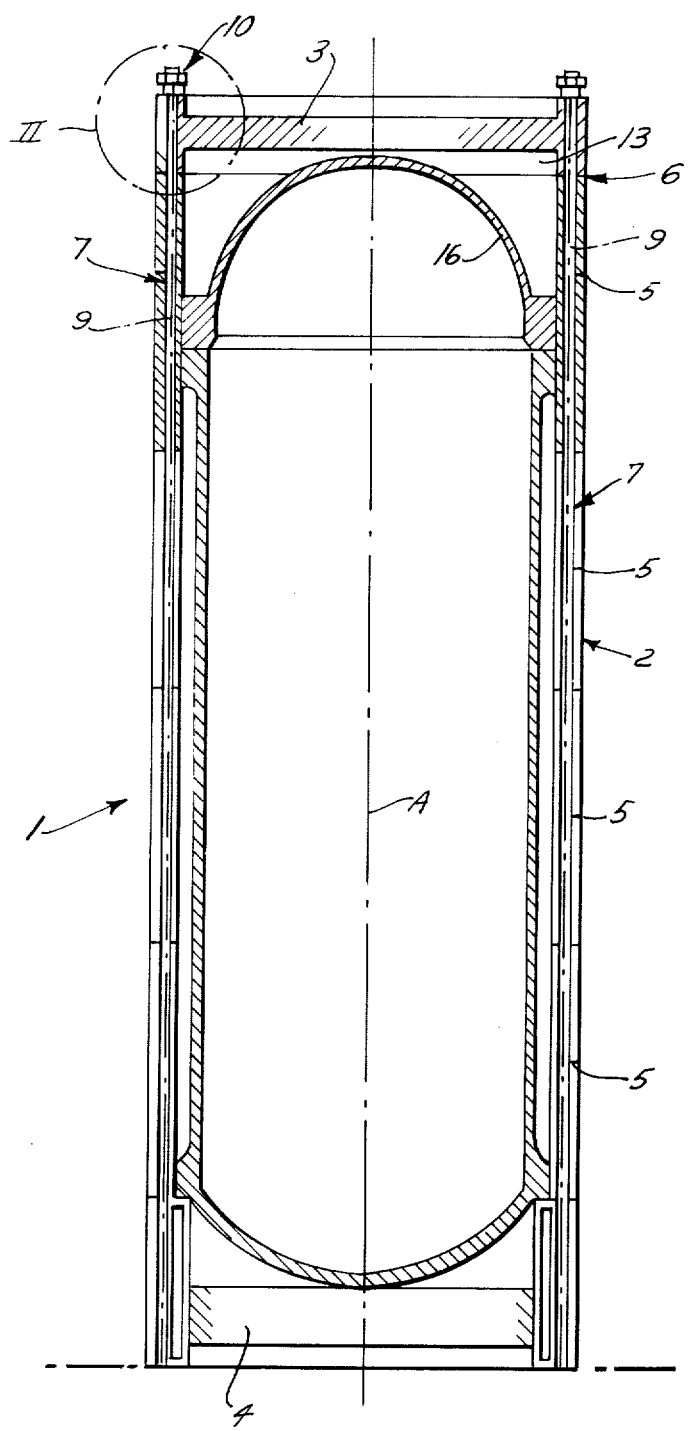
FIG. 1 is a vertical section through a burst shield and nuclear-reactor core according to the present invention.

As shown in FIG. 1 a nuclear-reactor having a pressurized core 16 is surrounded by a burst shield 1 formed by side wall 2, a cover 3, and a base 4. The side wall 2 is generally tubular and upright about a central axis A and is formed as a plurality of hollow castings 5 each having the shape of a segment of a cylindrical angle.

The side wall 2 has a planar upper edge 6 and is formed with a plurality of parallel throughgoing passages 7 extending axially through the entire wall 2. FIG. 2 indicates how a bundle 9 of steel prestressing rods 8 is received in this passage 7. The cover 3 is formed with a plurality of angularly equispaced cylindrical throughgoing holes 17 in line with the passages 7. The bundles 9 extend up through the cover 3 at this hole 17 and are provided at their upper ends with an anchor body 10 having an outside diameter D smaller than the inside diameter D' of the holes 17, which diameters D and D' are both substantially greater than the inside diameter d of the aligned passages 7.

A two-part cylindrical tube 12 is received in each of the throughgoing holes 17 surrounding a respective bundle of rods 8 and has an upper end 11 projecting above the upper surface of the cover 3 by a distance h and a lower end 28 resting on the surface 6.

The anchor body 10 is externally threaded at 18 and is provided with a nut 13 having an outside diameter D'' substantially greater than the diameter D' so that this nut 14 projects well beyond the respective orifice 17 and the cover 3 cannot be lifted past it. A spcer 15 formed of a pair of tube sections 15a and 15b having an inside diameter equal to D' and an outside diameter only slightly inferior to D'' has an axial height H slightly greater than the distance h and receivable between the nut 14 and the upper surface of the cover 3.

It should be noted that the tube 12 is similarly formed of two semicylindrical tubes sections 12a and 12b for ease of manufacture, the section planes of tubes 12 and 15 lying at right angles for greater strength.

The arrangement according to the present invention is used as follows:

Under normal operating conditions the spacer 15 is in place as shown in FIG. 2 so that the anchor body 10 is in direct force-transmitting relationship with cover 3 and prestresses the side wall through the cover 3.

In order to carry out an inspection of the cavity 13 between the shield 1 and the core 16 it is necessary to lift the anchor body 10 by means of a hydraulic jack or the like shown diagrammatically at 19 in FIG. 4. To this end it is possible to externally thread the nut 14 so as to allow the jack 19 to engage readily therewith. In this manner the nut 14 is lifted high enough so that the two sections 15a and 15b can be removed laterally from between it and the cover 3 as shown in FIG. 4.

Figure 5:
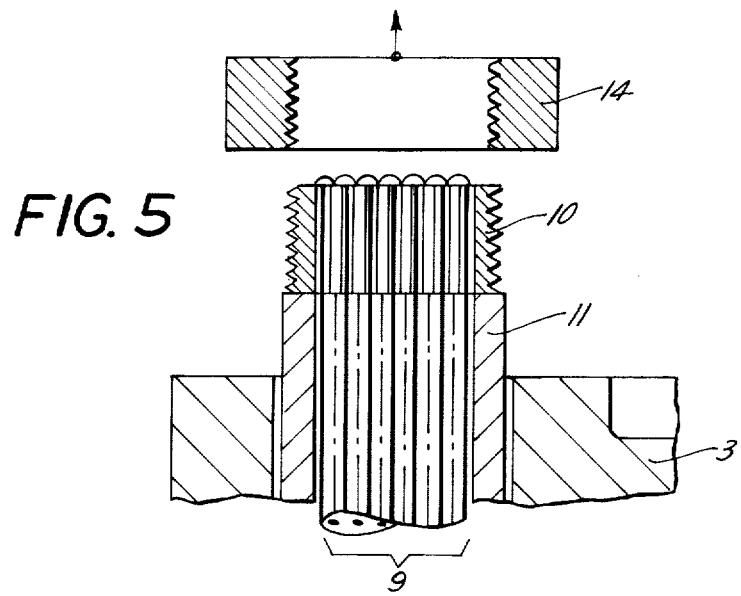
FIG. 5 is a view similar to FIG. 2 showing the clamping nut removed.

FIG. 5 shows how as soon as the pressure is released the anchor body 10 will settle down on the upper end 11 of the tube 12, so that the prestressing force in the rods 8 will be exerted through the tube 12 and to the uppermost side wall segment 5. Thereupon the nut 14 is unscrewed so that the cover 3 can be lifted off the edge 6. This is possible because the inner diameter D' is greater than the outer diameter of the sleeve 12 and the outer diameter D of the anchor body 10.

Figure 6:
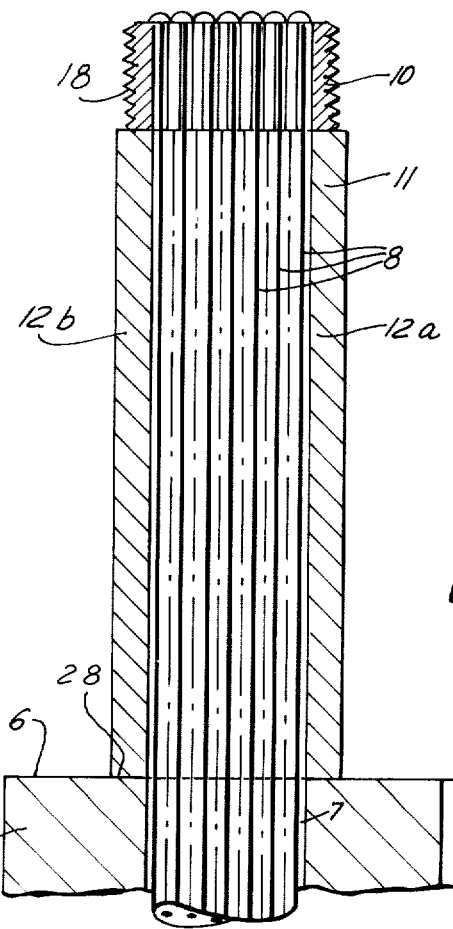
FIG. 6 is a view similar to FIG. 2 showing the cover and its clamping implements removed.

FIG. 6 shows how the arrangement appears once the cover 3 is fully removed.

The arrangement according to the present invention allows the cover to be readily removed without destressing the burst shield. The shield and cover are made of heavy castings also so as to be able to transmit the considerable force stored in the rods 8.

I claim:

1. A prestressed shield for a nuclear reactor, said shield comprising:
    an upright side wall having an upper edge and formed with a plurality of passages opening at said edge;
    a cover engaged over said edge and having a plurality of throughgoing holes registrable with said passages;
    a spacer element in each of said holes and extending up from said edge;
    a stressing member in each of said passages and each having a lower end anchored below said edge and an upper end projecting up through a respective hole past a respective spacer element; and
    means on said upper ends of said stressing members engaged selectively with said cover and with said spacer element for prestressing said members selectively against said cover and against said edge.

2. The shield defined in claim 1 wherein said side wall is closed and is formed of a plurality of hollow iron castings.

3. The shield defined in claim 2 wherein each spacer element is a generally cylindrical tube having an outer diameter smaller than the inner diameter of the respective hole and said means includes respective anchor bodies fixed at said upper ends of said stressing members and having outer diameters smaller than the inner diameters of said holes.

4. The shield defined in claim 3 wherein said means further includes a nut threadedly engageable over each of said anchor bodies and having an outer diameter larger than the inner diameter of said holes.

5. The shield defined in claim 4 wherein said means includes a spacer engageable between said nut and the upper surface of said cover for force transmission from said nut to said cover.

6. The shield defined in claim 5 wherein said spacer includes at least two rigid bodies having the shape of segments of a cylindrical tube, said rigid bodies being adapted to embrace the end of said tube projecting from said cover between said nut and said cover.

7. The shield defined in claim 5 wherein said tube is formed of at least two sections having the shape of segments of a cylindrical tube.

8. A method of removing the cover from the top of a side wall of a burst shield of a nuclear reactor, said method comprising the steps of:

applying upward force to anchor bodies on the upper ends of prestressing members extending upwardly from passages in the side walls and through the cover sufficient to free a spacer element between said anchor bodies and said cover;

removing said spacer element from between the upwardly stressed anchor body and said cover;

releasing said upward force to set said anchor body, with said prestressing member still longitudinally stressed, on one end of a tube surrounding said body and having its other end standing on said edge of said side wall; and lifting said cover off said edge.

* * * * *